April 5, 1966  O. L. HENRY  3,244,194
BLAST CLOSURE VALVE
Filed March 27, 1962  2 Sheets-Sheet 1

INVENTOR.
ORMOND LEE HENRY
BY
ATTORNEY.

April 5, 1966     O. L. HENRY     3,244,194
BLAST CLOSURE VALVE

Filed March 27, 1962     2 Sheets-Sheet 2

INVENTOR.
ORMOND LEE HENRY
BY
ATTORNEY.

United States Patent Office 3,244,194
Patented Apr. 5, 1966

3,244,194
BLAST CLOSURE VALVE
Ormond Lee Henry, Stamford, Conn., assignor to American Machine & Foundry Company, a corporation of New Jersey
Filed Mar. 27, 1962, Ser. No. 182,850
10 Claims. (Cl. 137—460)

This invention relates to a valve of novel configuration and to its method of operability. More specifically, this invention relates to a blast or explosion actuated valve. The invention is primarily directed to a valve of the kind in which the swing or valve head is shut by impingement thereon of the pressure of a blast. The valve has a variety of uses but in particular it has a preferred application in the protection of ventilation systems against the hazards of nuclear detonation or other explosions.

Some of the predominant advantageous features of the novel blast valve of this invention reside in: its relatively low cost and simplicity of construction, its reliability and its positive sealing against explosive as well as implosive pressures. An additional advantage resides in its ready adaptability to manual as well as mechanical and electrical remote actuation.

In general, it is the object of the present invention to provide a valve which is actuated by direct response to the pressures of an explosion or blast and which is suitable for protection of relatively delicate air filtration system against the violent effects of such pressures. It is a further and more particular object of the invention to provide a dependable relatively inexpensive valve which is particularly advantageous and dependable in sealing ventilation systems against damage from positive as well as negative pressure phases of blasts or detonation.

Additional objects and advantages will become apparent from the description which follows considered with the accompanying drawing in which.

Figure 1:
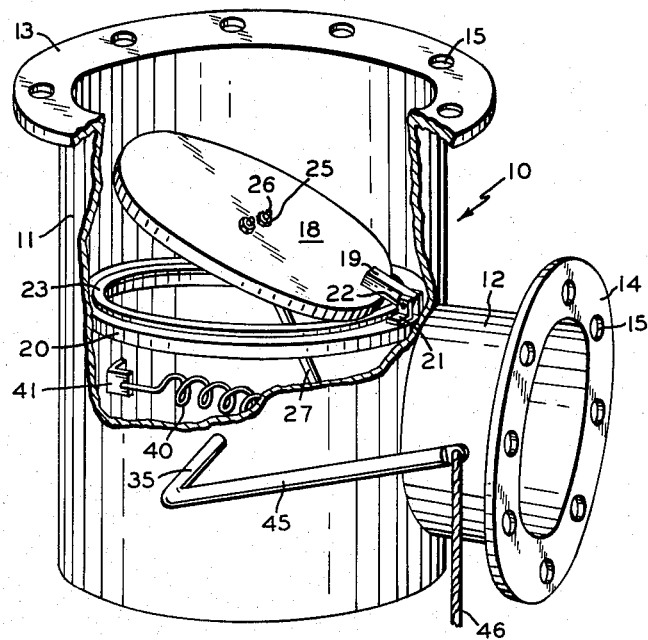
FIG. 1 is a perspective view of the valve with the wall partially broken away to illustrate the pivotable swing head and in part the actuating mechanism.

The valve of the present invention will be described in conjunction with its use in air intake and exhaust conduits for shelters against nuclear explosions but it will be apparent that it may be employed in a variety of alternate applications in which a device of this character is advantageous.

In the event of a nuclear explosion, the intake and exhaust systems of blast shelters must be sealed off to prevent damage of various kinds. One of the primary reasons for a dependable valve is so that the filters in the shelter air inlet will never experience a pressure differential great enough to be damaged. Safeguarding of the filters requires that the system be sealed off during both the positive and the negative pressure phases of a nuclear detonation.

In essence, this invention provides a valve which will close under sudden increases in pressure outside the shelter and will stay closed until affirmatively reopened, thus sealing off the system, when the outside pressure drops below that within the shelter. Alternately, the open valve may be closed by manual actuation to seal the inlet and exhaust opening during both pressure phases without in any way altering the set up of the valve. As a further alternative, actuation of the valve to the closed or open position may be effected by an electrical signal or by a mechanical or electromechanical system or linkage.

The elements of the valve and its operation will now be described in conjunction with the figures of the drawing. As illustrated, the valve 10 comprises a body or case 11 of conventional arrangement containing a conduit section 12 and suitable flanges 13 and 14 with apertures 15 for installation. Although the valve casing 11 is illustrated as comprising a valve with a substantially L-shaped passage, it will be apparent that a variety of alternate configurations may be employed. Suitably arranged in and secured to the case 11 is an annular valve seat 20, preferably equipped with a gasket 23, upon which the valve head closes. The valve arrangement comprises a valve head 18 appropriately hinged at 22 through the connectors 19 to the seat hinge clips 21 secured to the seat 20. It will be apparent that the head 18 may optionally be suitably secured to the case 11 by any suitable means which permit pivoting of the head.

Conveniently secured in a pivotal relationship with the head 18 is an irregularly shaped yoke or lock element 27. As shown, the yoke 27 is attached through the eye bend 28 to the head 18 by means of a U-bolt secured to the head by nuts 25. Although the yoke 27 is illustrated as, and preferably is, secured at substantially the center of the head 18, it will be apparent that the yoke may be otherwise attached at the other suitable places on the head. It is also apparent that means other than the eye arrangement 28 may be used to afford pivotal movement between the head 18 and yoke 27. The yoke comprises, as an integral part thereof, a heel-like bend 29 and inclined section 30, a knuckle bend 31, a U section 32 and a toe terminal portion 33.

Figure 2:
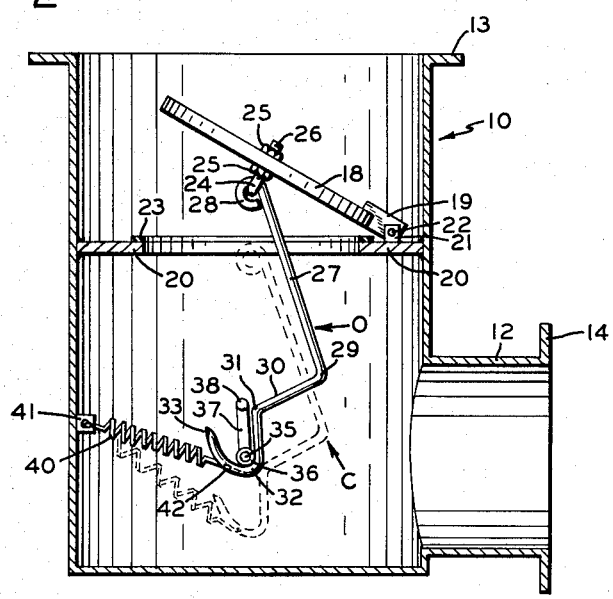
FIG. 2 is a cross-section view of the valve arrangement of element.
Figure 3:
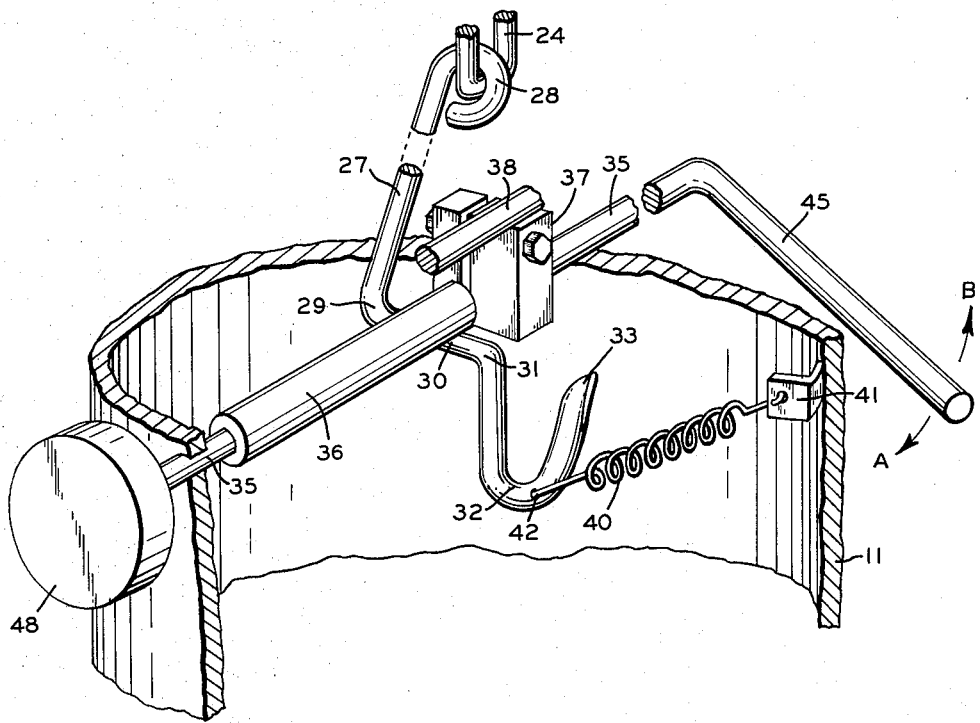
FIG. 3 is a perspective view of the actuating elements showing a portion of the valve body and incorporating a solenoid actuator.

Transversely positioned with respect to the yoke 27 is a shaft 35 to which is secured, through a carrier 37, a cam 38. The carrier 37 may be integrally formed with the shaft or affixed thereto by suitable means such as the split block and clamp nut configuration 39 illustrated in FIG. 3 so that the shaft carrier and cam rotate in unison. The shaft 35 preferably carries a bearing bushing 36 to facilitate the movement of the yoke 27 over and adjacent the knuckle portion or bend 31 as the mechanism is actuated. The mechanism is arranged so that the yoke operates conjointly with the shaft against which it bears. To retain the yoke 27 in bearing relationship against the shaft and to hold the head 18 in the normally open position, a spring means is suitably utilized. As shown, the conventional spring 40 under tension is secured to the case 11 at 41 and to the U section 36 of the yoke 27 at 42. Arrangement of the spring is such that, as shown in FIG. 2, the connecting point at 41 is situated on a higher plane, i.e. closer to the valve head when the head is in the open position, than the point 42 where the spring 40 is fastened to the yoke 27.

The valve of the invention is suitably arranged for manual operation by means of the handle 45 which comprises an extension of the shaft 35. Optionally, the valve may be actuated remotely such as through a solenoid mechanism 48 (FIG. 3) that provides rotary movement, e.g. such as the Ledex Solenoid S–8217–021 marketed by G. H. Leland Co. of Dayton, Ohio, or through any appropriate alternate conventional arrangement.

Figure 4:
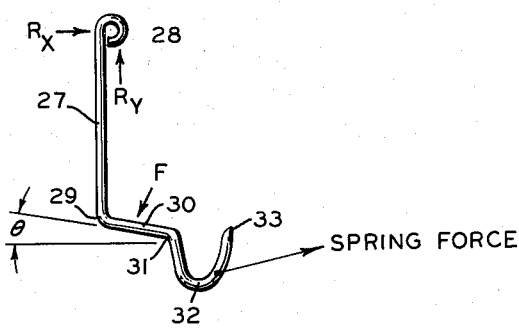
FIG. 4 illustrates the yoke lock element in detail.

By reference in particular to FIG. 4 of the drawing, the ability of the valve to seal under negative pressure, i.e. when a higher pressure exists inside the shelter than outside, will now be described.

The force of the spring 40 acting through the incline surface 30 gives a large force F component down on the lock. Solution of the forces operating in the actuation of the mechanism shows that the force Ry holding the head down, is a large multiple of the force offered by the spring. The magnitude of this multiplier applied to the force (which may be designated K) can be varied over wide range by changing the angle $\theta$. Decreasing the angle increases the value of K.

Advantages of incline surface 30 over a fixed lock is that substantial deflections or tolerances in the parts (i.e. lock, swing head, shaft) will be taken up by movement of the lock; and the rim of the head will seat on the gasket as long as the force $Ry$ is greater than the differential pressure (negative) times the area of the head.

The operation of the valve is as follows:

*Blast operation—closing*

As the blast wave strikes the open head 18, it pivots the head at the hinge and seats it against the gasket 23. While the head is closing, the yoke 27 travels essentially in a straight line (from position "O" to position "C" shown in broken line in FIG. 2) during which time the incline surface 30 moves under the shaft, movement being facilitated by bearing on the rotating bushing 36. The incline surface as it wedges under the shaft progressively makes (through the tension force of spring 40) a tighter seal as the head is locked closed.

*Manual operation—opening*

As the manual lever 45 is turned in direction B (see FIG. 3), the cam 38 contacts the yoke 27 (at a point above the heel 29) and pushes the yoke back until the cam comes in contact with the inclined surface 30 at which point the incline surface is no longer under shaft 35, i.e. the yoke 27 is then essentially in the position shown by broken line in FIG. 2. At this point, the knuckle bend 31 of the yoke 27 passes the shaft 35 and action of spring 40 takes over to tend to raise the yoke vertically and to pivot the head in open position. As the lever is returned 90° (moving the cam out of the way) in direction A, the spring returns the head and lock to the up position.

*Manual operation—closing*

As the manual lever is turned in direction A (FIG. 3), the cam 38 contacts the toe 33 of yoke 27 and moves the yoke in a downward direction (see broken line position of FIG. 2). As this movement pivots the head 18 to closed position, the incline portion 30 of the yoke 27 is positioned under the shaft 35. Spring tension operating in conjunction with the incline plane 30 applies force through the yoke to effect a seal of the head on the seat.

The valve may also be closed by an electrical signal by mounting a rotary solenoid on the end of the shaft or by other conventional element capable of effecting this purpose. When actuated, the solenoid turns the shaft in direction A, forces the knuckle down with the cam and closes the valve. In a similar manner, a suitable arrangement may be employed to effect electrical opening of the valve head.

While the invention has been described in conjunction with a detailed configuration of the yoke member 27, it will be apparent that this member may be varied in certain respects without departing from the spirit of the invention. In essence, the invention resides in the desirable effect obtained through the operation of the inclined surface 30 which imparts the vertical force to provide a secure seal. Various arrangements may be substituted for the U-shaped portion of the yoke which functions essentially to retain the yoke in proper relationship to the shaft and cam member.

It is thus seen that the valve of the present invention provides plurality of distinctive features and advantages including the following:

(1) The head of the valve is positively sealed around the edges during both the positive and the negative pressure phase of an explosion.

(2) Deflection of the parts will not cause leakage since the inclined surface will take up any "slack" which is present through tolerances due to manufacture or which develop by wear during use.

(3) The spring line of action is such that it offers negligible resistance to closing while utilizing effective closing force.

(4) A relatively small spring is required to provide sealing during the negative pressure phase since a large mechanical advantage is derived from the inclined portion of the lock or yoke member.

(5) The design is extremely attractive due to its simplicity and economy and with its minimum of moving parts offers excellent dependability.

It will be apparent to those skilled in the art that various additional modifications may be made in the invention without departing from the scope of the invention. Accordingly, the invention is not to be limited except insofar as necessitated by the appended claims.

I claim:

1. A valve comprising a casing defining a passage through which fluid is passed, a seat in said casing adapted to receive a head to seal said passage, a head for sealing said passage, means for pivoting said head to open and close position with respect to said seat, said means comprising a locking yoke pivotally connected to said head and through which said head is actuated to open and close position, said yoke comprising an inclined portion, a shaft remote from said head affixed to said casing in a transverse position with respect to said yoke and in abutting relationship with the portions of said yoke contiguous to said inclined portion, spring means tending to open said head through said yoke and to retain said inclined portion of the yoke in association with said shaft and means in association with said yoke and shaft to provide movement of said yoke in conjunction with said shaft and said inclined portion to open and close said head.

2. A valve comprising a casing defining a passage through which fluid is passed; a seat in said casing adapted to receive a head to seal said passage; a head for sealing said passage; means for pivotally connecting said head for open and close position with respect to said seat; a locking yoke pivotally connected to said head through which said head is moved to open and close position, said yoke comprising an inclined portion and a substantially U-shaped terminal portion; a rotatably movable shaft remote from said head affixed to said casing and transversely disposed with respect to said yoke and in abutting relationship with the portions of said yoke contiguous to said inclined and U-shaped portions of said yoke; a cam carried by, and fixed for movement in unison with, said shaft to provide displacement of said yoke when said shaft is rotated; spring means affixed to said casing between said seat and said shaft and to said yoke substantially at the end thereof remote from said head to retain the yoke in abutting relationship to said shaft, and means external of said casing to actuate said shaft.

3. The valve of claim 2 in which the shaft carries a bearing freely rotatable with respect to said shaft and upon which the yoke bears.

4. A valve capable of actuation by pressure forces impinging on the valve head comprising a casing defining a passage through which fluid is passed; a seat in said casing adapted to receive a head to seal said passage; a head disposed for access to pressure changes for sealing said passage; means for pivotally connecting the head for open and close position with respect to said seat; a locking yoke pivotally connected to said head through which said head is moved to open and close position, said yoke comprising an inclined portion and a substantially U-shaped terminal portion; a shaft remote from said head rotatably movable and affixed to said casing and transversely disposed with respect to said yoke and in abutting relationship with the portions of said yoke contiguous to said inclined and U-shaped portions of said yoke; a cam carried by, and fixed for movement in unison with, said shaft to provide displacement of said yoke when said shaft is rotated; spring means affixed to said casing between said seat and said shaft and to said yoke substantially at the end thereof remote from said head to retain the yoke in abutting relationship to said shaft; and means external of said casing operable through said shaft to actuate said shaft.

5. The valve of claim 4 in which the shaft carries a bearing freely rotatable with respect to said shaft and upon which the yoke bears.

6. The valve of claim 4 in which the external means to actuate the movement of the shaft comprises an extension of the shaft which is bent to provide manual leverage.

7. The valve of claim 4 in which the external means to actuate the movement of the shaft comprises a solenoid equipped with an arrangement to provide rotation to said shaft.

8. A valve capable of actuation by pressure forces impinging on the valve head comprising a casing defining a passage through which fluid is passed, a seat in said casing adapted to receive a head to seal said passage, a head disposed for access to pressure changes for sealing said passage, means for pivotally connecting the head for open and close position with respect to said seat, spring means tending to retain said head in the open position, a locking yoke pivotally connected to said head through which said head is pivoted to open and close position, said yoke comprising an inclined portion and a substantially U-shaped terminal portion, a shaft remote from said head rotatably movable and affixed to said casing and transversely disposed with respect to said yoke and in abutting relationship with the portions of said yoke contiguous to said inclined and U-shaped portions of said yoke, a bearing on said shaft freely rotatable with respect to said shaft on which said yoke bears, a cam carried by and fixed for movement in unison with said shaft to provide displacement of said yoke when said shaft is rotated, said spring means affixed to said casing between said seat and said shaft and to said yoke substantially at the end thereof remote from said head to retain the yoke in abutting relationship to said shaft, and means external of said casing operable through said shaft to actuate rotary movement of said shaft.

9. A valve capable of actuation by pressure forces impinging on the valve head comprising a casing defining a passage through which fluid is passed, a seat in said casing adapted to receive a head to seal said passage, a head disposed for access to pressure changes for sealing said passage, means for pivotally connecting the head for open and close position with respect to said seat, a locking yoke pivotally connected to said head through which said head is pivoted to open and close position, said yoke comprising an inclined portion and substantially U-shaped terminal portion, a shaft remote from said head rotatably movable and affixed to said casing and transversely disposed with respect to said yoke and in abutting relationship with the portions of said yoke contiguous to said inclined and U-shaped portions of said yoke, a bearing on said shaft freely rotatable with respect to said shaft on which said yoke bears, a cam carried by and fixed for movement in unison with said shaft to provide displacement of said yoke when said shaft is rotated, spring means affixed to said casing between said seat and said shaft and to said yoke substantially at the end thereof remote from said head to retain the yoke in abutting relationship to said shaft, and means external of said casing comprising a bent extension at one end of said shaft to provide manual leverage to rotate the shaft and a solenoid equipped with an arrangement to provide rotation to the shaft through electrical impulse, at the other end of said shaft.

10. In a valve arrangement having a pivoting closure head the method for effecting movement of said head to open and close position with comprises; utilizing a locking yoke which contains an inclined portion and which yoke is attached to said closure head to actuate said head, said yoke being arranged so that in the closed position said inclined portion is wedged beneath an element which is remote from said head and is transversely disposed with respect to said inclined portion of said yoke and relatively fixed against movement in the direction of said yoke; and utilizing spring means tending to open said head through the locking yoke to effect transverse movement of said inclined portion by bearing on said transverse element thereby effecting sealing means, through the vertical component of force imparted to the yoke, as the inclined portion is moved.

References Cited by the Examiner
UNITED STATES PATENTS

| | | | |
|---|---|---|---|
| 2,269,782 | 1/1942 | Packwood | 251—263 X |
| 3,013,582 | 12/1961 | Eibl | 251—228 X |
| 3,026,902 | 3/1962 | Ruhl | 251—75 X |
| 3,037,484 | 6/1962 | Dixon | 251—75 X |
| 3,037,737 | 6/1962 | Konemund et al. | 251—299 X |

M. CARY NELSON, *Primary Examiner.*